United States Patent [19]

Tyler

[11] 4,385,212
[45] May 24, 1983

[54] EXPANDABLE COMMUNICATION TERMINAL HOUSING

[75] Inventor: Daniel W. Tyler, Middletown, N.J.

[73] Assignee: Bell Telephone Laboratories Incorporated, Murray Hill, N.J.

[21] Appl. No.: 308,503

[22] Filed: Oct. 5, 1981

[51] Int. Cl.³ .................. H04M 1/00; H04M 1/02
[52] U.S. Cl. .................. 179/179; 179/100 D; 179/100 C; 312/111
[58] Field of Search .......... 179/1 PC, 100 R, 100 D, 179/100 C, 178, 179; 312/111, 205, 257 SK, 263; 455/349; 220/23.2, 23.4

[56] References Cited

U.S. PATENT DOCUMENTS

| D. 224,714 | 9/1972 | Wenzler | D14/59 |
| 3,514,170 | 5/1970 | Shewchuk | 312/111 |
| 3,774,984 | 11/1973 | Banko et al. | 312/8 |
| 3,916,103 | 10/1975 | Morrell et al. | 179/1 PC |
| 4,286,124 | 8/1981 | Guttman | 179/179 |

FOREIGN PATENT DOCUMENTS 1223889 9/1966 Fed. Rep. of Germany ... 179/100 D

Primary Examiner—G. Z. Rubinson
Assistant Examiner—Randall P. Myers
Attorney, Agent, or Firm—David H. Tannenbaum

[57] ABSTRACT

An expandable telephone housing has been developed which allows for easy lateral expansion. The housing contains front and rear slides and an end cap which is removable. For expansion the end cap is removed exposing a mating mechanism for locking to an expansion housing. The expansion housing contains a face plate having additional lamps or buttons. New, and longer, front and rear slides are positioned along the front and rear edges of the combined housing to secure the now elongated structure. When assembled, the combined housings give the appearance of a single housing. The rear slide may be arranged for securing an auxiliary display unit.

13 Claims, 9 Drawing Figures

EXPANDABLE COMMUNICATION TERMINAL HOUSING

BACKGROUND OF THE INVENTION

This invention relates to a telephone housing adapted for easy lateral expansion and also adapted for use with a rear display.

The telephone has become an indispensable part of the business office environment, and indeed the uses of the telephone have been increasing dramatically in the last few years. As new uses are found, it often becomes necessary to expand the telephone housing to include new or different arrangements of buttons, lamps or displays. Typically in the past, such expansion has occurred simply by placing a second or third auxiliary housing adjacent to, and usually physically detached, from the main telephone housing. Such an arrangement is unsightly and requires interconnection by means of cords and plugs which in turn increases the clutter of the office.

Often it is necessary to provide a special elevated display which in the past has been provided on a separate pedestal disassociated from the main console. Again, this arrangement is, from a space economy point of view, very inefficient.

SUMMARY OF THE INVENTION

I have solved the aforementioned problem by designing a basic telephone housing which allows for easy lateral expansion. The housing contains front and rear slides and an end cap all of which are removable. For expansion, the end cap is removed exposing a mating mechanism for locking to an expansion housing. The front and rear slides are removed allowing an expansion housing, containing a face plate hving additional lamps or buttons to be attached to the side of the basic housing. New, and longer, front and rear slides are positioned along the front and rear edges to securely interlock the now elongated housing. When assembled, the combined housings give the appearance of a single housing. The rear slide may be arranged with a mating connector for supporting an auxiliary display device.

DETAILED DESCRIPTION

Figure 1:
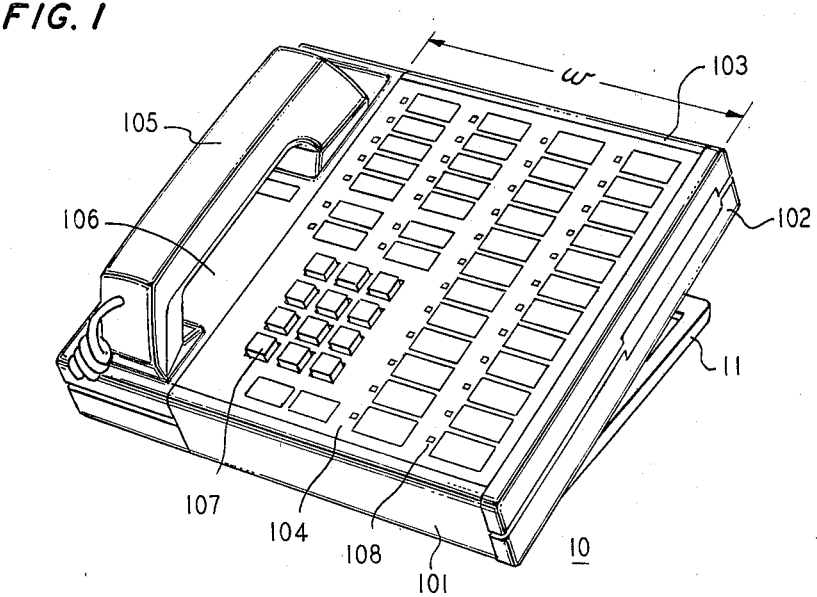
FIG. 1 shows a perspective view of a basic telephone housing.

A basic telephone housing 10 is shown in FIG. 1 having two main sections 104 and 106. Section 106 is a cradle for supporting handset 105, while section 104 is a face plate for the basic housing which contains, for example, buttons 107 and lamps 108. Face plate section 104 has a width W and front and rear slides 101 and 103, respectively, and end cap 102. Housing 10 is shown tilted forward and supported by a base, such as base 11.

Figure 2:
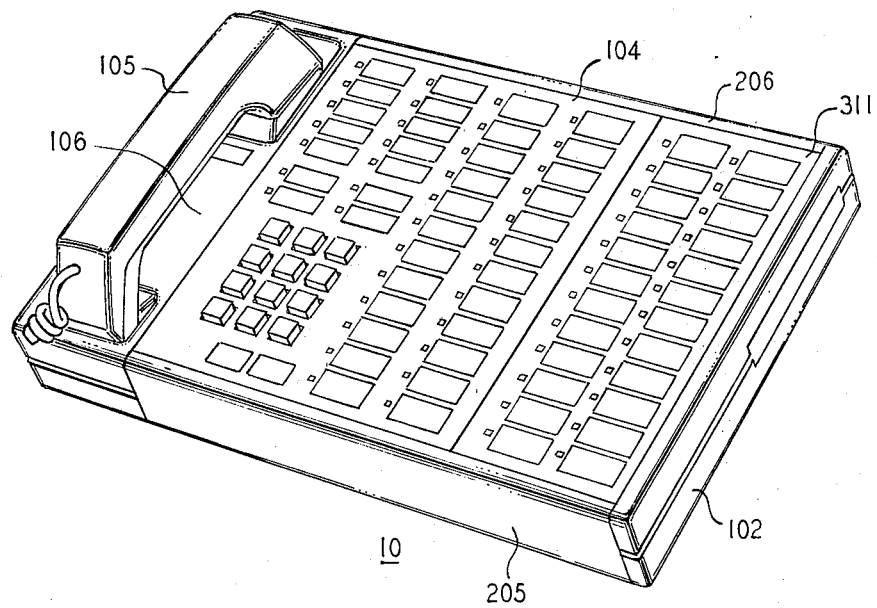
FIG. 2 shows a perspective view of an expanded telephone housing.

In FIG. 2 housing 10 is shown expanded with the addition of face plate 311. As can be seen, front slide 101 has been replaced by front slide 205 and rear slide 103 has been replaced by rear slide 206. End cap 102 in both arrangements is advantageously the same.

Figure 3:
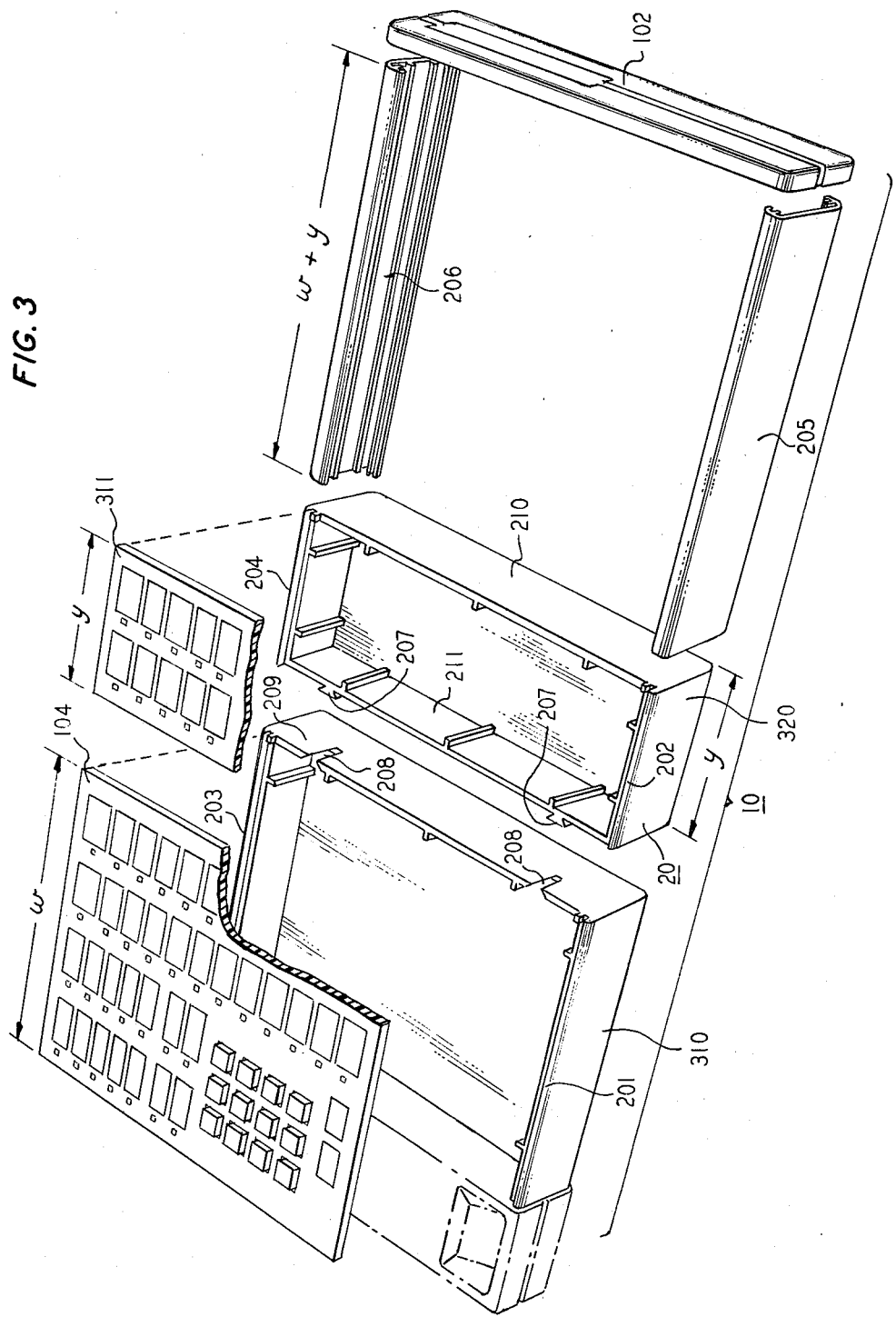
FIG. 3 is an exploded view showing the expanded housing.

The manner in which the housing is expanded is shown in FIG. 3. Procedurally, end cap 102 is removed from housing 10 and slides 101 and 103 (not shown in FIG. 3) are removed. Slides 101 and 103 have a length W to conform to the size of face plate 104, as shown in FIG. 1. When slides 101 and 103 have been removed, expansion housing base 320 can be connected to the side of original housing base 310 via the mating interlocks 207 and 208. New face plate 311 is added abutting face plate 104. Face plate 311 has a width Y which is equal to the width of added housing base 320.

With face plates 104 and 311 in place, slides 205 and 206, which have a length w+y, slide along tracks 202-201 and 204-203, respectively, thereby locking housing bases 310 and 320 together. This locking occurs, in this embodiment, by the fact that when the slides are in position, base 320 cannot be lifted and thus interlocks 207, 208 hold the bases together. At the same time face plates 104 and 301 are also restrained in the manner to be more fully detailed hereinafter. End cap 102 is then snapped on to the end of housing base 320, forming an elongated housing 10 which is now rigidly secured in all directions.

The housing may be further secured by a fastener, such as a screw, through end cap 102 and into housing 320 if so desired. This arrangement, however, will usually not be necessary.

Figure 6:
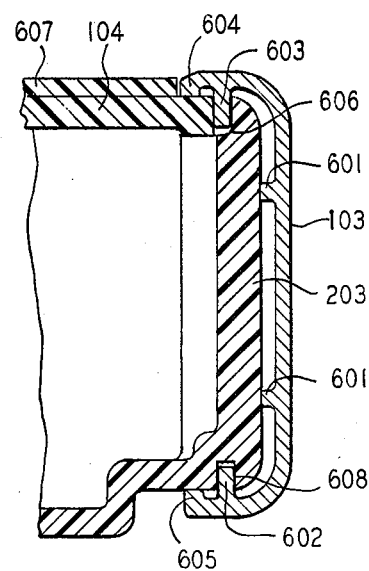
FIG. 6 shows a sectional view of a rear interlocking slide.

In FIG. 6, slide 103 (which is constructed in the same manner as are slides 101, 206 and 205) is shown having upper and lower bearing surfaces 604 and 605, respectively. Bearing surface 604 serves to hold face plate 104 (and face plate 311 in the elongated version) against the housing base while bearing surface 605 presses against the underside of the housing.

Protrusions 602 and 603 ride in grooves 606 and 608, respectively, which grooves are cut in housing back 203. Bearing surfaces 601 are used to provide stiffening and support for slide 103. When slide 103 is in position, the face plate 104 is prevented from upward movement as discussed previously.

Figure 7:
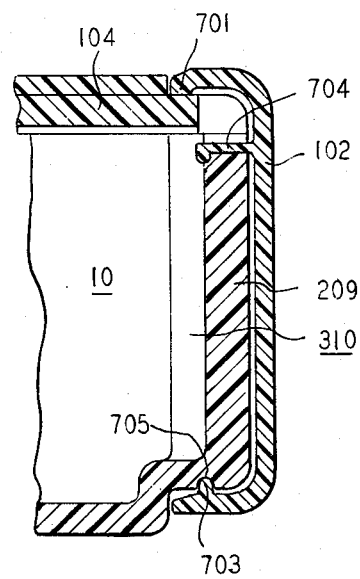
FIG. 7 shows a sectional view of the removable end cap.

End cap 102 is shown in FIG. 7 having a bearing surface 701 which rides on housing base 310 or on housing base 320 in the elongated version. Protrusion 703 of end cap 102 mates with indention 70 of housing base 310, or with housing base 320 in the elongated version, thereby holding the entire assembly together.

Display Mount

Figure 4:
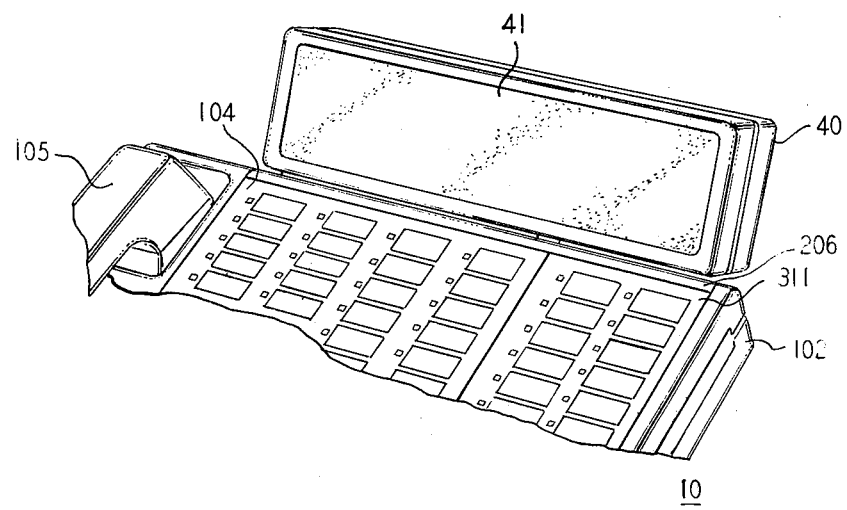
FIG. 4 is a view showing a display connected to the expanded housing.
Figure 5:
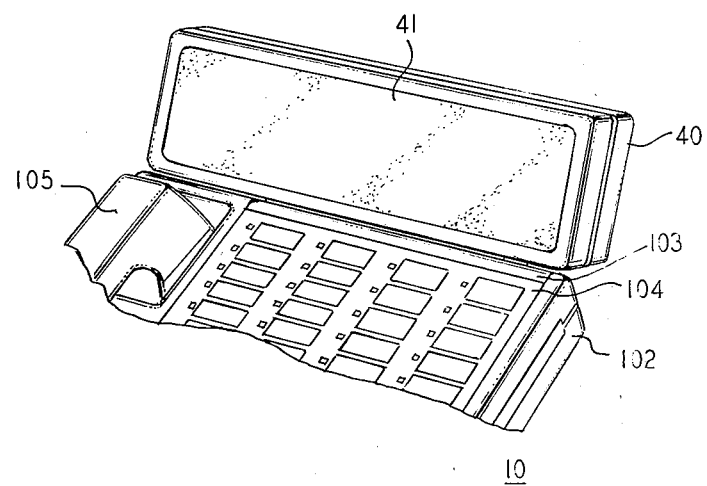
FIG. 5 shows a display connected to the basic housing.

As shown in FIGS. 4 and 5, display 40, having face 41, is mounted at the rear of telephone housing 10. FIG. 4 shows the elongated version while FIG. 5 shows the basic version. The mounting arrangement is shown in FIGS. 8 and 9.

Figure 8:
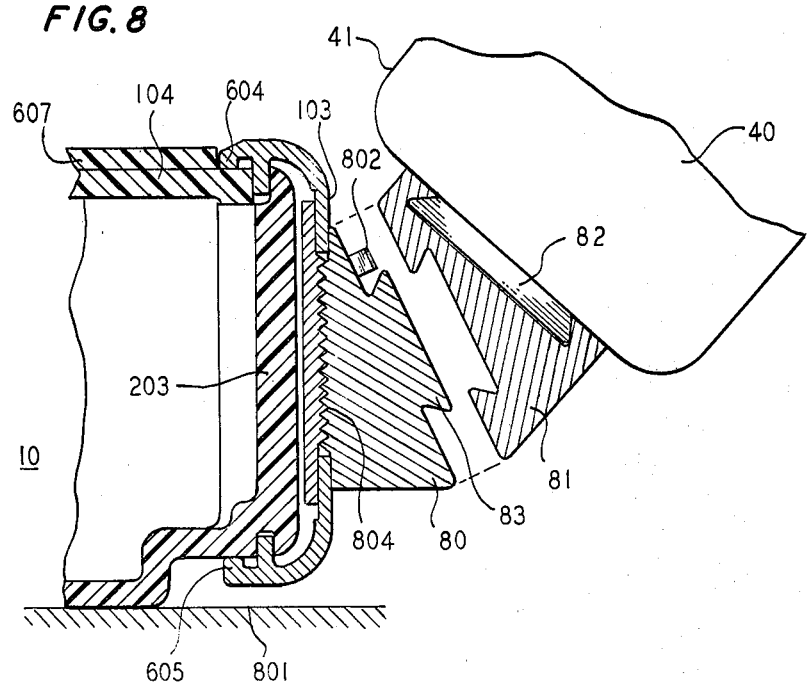
FIGS. 8 and 9 show details of the display mounting arrangement.

In FIG. 8, rear slide 103 has attached thereto bracket 80 which may be attached in two pieces as shown, or which may be glued or screwed directly to slide 103. Display 40 has a protrusion 82 adapted for mating with interconnecting block 81, which block in turn is also adapted for mating with block 80. In the embodiment, the mating relationship is shown as tongue and groove. When connecting block 81 is in mating relationship with block 80 and with display 40, spring 802 applies pressure to the structure thereby keeping it rigid, as well as assisting in preventing the parts from separating.

Figure 9:
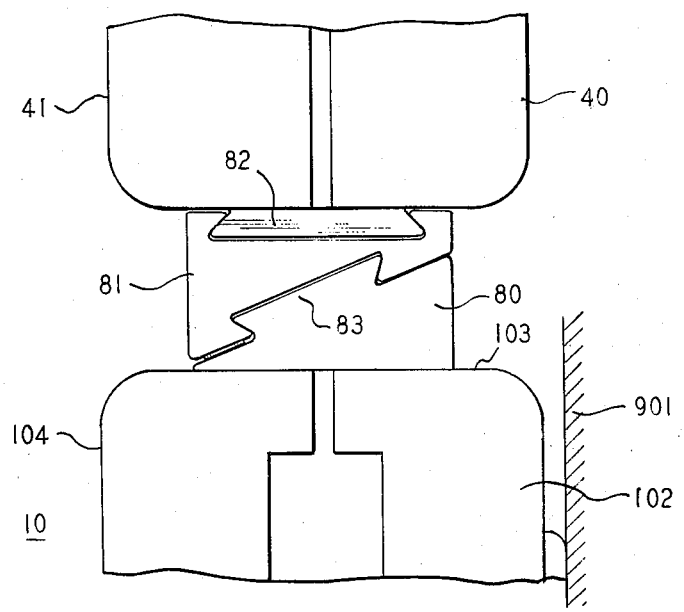

FIG. 9 shows the reversal of mating block 81 so that the display, instead of being tilted upward, is maintained in the same plane as is the face plate of the telephone housing. The arrangement is particularly adapted for use when the telephone is to be mounted on a vertical surface, such as on wall 901.

It should also be borne in mind that, while a single expansion is shown in the embodiment, it is possible to add many expansion housings by using my expansion concept. For support of the rear display, separate slides may be employed, each having different types of connecting devices, thereby eliminating any need for special tools for installing additional parts of the housing. This arrangement then will facilitate customers in changing their telephone housings as their needs change over the years.

It should be noted that the electrical connections are not shown but would typically be done within the housing. The electrical connections between the housing bases could be, for example, by a cord and plug (in which case appropriate openings would be made in portions 209 and 211 of the bases) or could be accomplished by a plug-in arrangement directly between the bases.

Of course, those skilled in the art may devise many adaptations of my arrangement all within the scope of my invention.

What is claimed is:

1. A housing having front, back, left and right edges,
    a first face plate, 'a first set of locking members each having a length equal to the width of said terminal housing, one of said locking members adapted for interlocking with said terminal housing front edge and with an edge of said first face plate and the other of said locking members adapted for interlocking with said terminal housing back edge and with an edge of said first face plate,
    at lest one of said terminal housing edges including mating means,
    an end member removably attachable to one or the other side edges of said terminal housing and arranged to expose said mating means when removed,
    an extension housing having front, back, left and right edges,
    at least one of said extension housing edges including mating means complimentary to said housing mating means,
    a second face plate adapted for abutting said first face plate when said terminal housing and said extension terminal housing are in mated relationship, and
    a second set of locking members adapted for replacing said first set of locking members, each said second set locking member having a length substantially equal to the width of said housing plus the width of said extension housing, one of said second set of locking members adapted for concurrently interlocking said front edge of said housing with said front edge of said extension housing and with said first and second face plates when both of said housings are in mated relationship, and the other of said second set of locking members adapted for concurrently interlocking said back edge of said housing with said back edge of said extension housing and with said first and second face plates when both of said housings are in mated relationship.

2. The invention set forth in claim 1 wherein said front and back housing edges and said front and back extension housing edges include a grooved top surface and a grooved bottom surface, said grooved surfaces adapted to accept mating protrusions on said first or second set of locking members.

3. The invention set forth in claim 1 wherein at least one of said locking members of said first or said second set includes means for supporting an auxiliary display unit.

4. The invention set forth in claim 3 wherein said supporting means includes a first mating member attachable to said locking member,
    a second mating member attached to said display unit, and
    a connector for mating with and between said first and second mating members, said connector adapted for holding said display unit at either a first or a second angle with respect to the plane of said housing face plate, said first angle being established by said connector mated in a first position with respect to said first and second mating members and said second angle being established by said connector being mated in a position between said first and second mating members reverse from said first position.

5. An expansion housing for use in conjunction with a basic housing, said basic housing including a first face plate, a first set of locking members each adapted to slide along a forward or rear surface of said basic housing to secure said first face plate to said basic housing, interlocking means on one end thereof,
    said expansion housing comprising second interlocking means on one end thereof, said second interlocking means arranged to mate with said first interlocking means when said expansion housing is positioned adjacent to and abutting with said basic housing,
    a second face plate, and
    a second set of locking members for replacing said first set of locking members, said second set of locking members each having a length substantially equal to the combined widths of said basic and expansion housings when said housings are in abutted relationship, said locking members adapted to slide along said forward and rear surfaces of said housings thereby interlocking said housings and said faceplates.

6. The invention set forth in claim 5 wherein said housings each have grooves in said forward and rear surfaces to accept a mating structure of said locking members.

7. A basic housing for use in conjunction with an exapnsion housing, said expansion housing including
    a first face plate, a first set of locking members each adapted to slide along a forward or rear surface of said expansion housing to secure said first face plate to said expansion housing, interlocking means on one end thereof,
    said basic housing comprising second interlocking means on one end thereof, said second interlocking means arranged for mating relationship with said first interlocking means when said expansion housing is positioned adjacent to and abutting with said basic housing, a second face plate, and a second set of locking members for replacing said first set of locking members, said second set of locking members each adapted to slide along a forward or rear surface of a combined basic and expansion housing to secure said first and second face plates to said combined housing.

8. The invention set forth in claim 7 wherein said housings each have grooves in said forward and rear surfaces to accept a mating structure of said locking members.

9. The method of expanding a communication housing where the housing has a supporting base and a face plate for attachment to said supporting base, said method comprising the steps of removing an end cap from said supporting base and exposing a mating mechanism, removing a set of sliding members from the front and from the rear of said supporting base thereby freeing said face plate, attaching a second supporting housing adjacent to and abutting said supporting base by interlocking said exposed mating mechanism with a like mating mechanism on one side of said second supporting base, placing a second face plate on said second supporting base, substituting said sliding members with a second set of sliding members having a length substantially equal to the combined lengths of said face plate and said second face plate, replacing said substituted sliding members on the front and on the rear of said interlocked supporting bases, and replacing said end cap on the now exposed end of said second supporting base.

10. The invention set forth in claim 9 further comprising the steps of substituting for one of said sliding members a display sliding member having a support for a display unit, and connecting said display unit to said housing by attaching said display unit to said support.

11. The invention set forth in claim 10 wherein said last-mentioned step includes the use of a reversible connector between said support and said display unit, said connector being adapted to change the angle between said housing and said display unit.

12. The method of expanding a communication housing where the housing has a supporting base and a face plate for attachment to said supporting base, said method comprising the steps of removing an end cap from said supporting base, removing one of a set of sliding members from the rear of said supporting base thereby freeing said face plate, substituting said removed sliding member with a second sliding member having a support for a rear hung display unit, replacing said substituted sliding member on the rear of said supporting base, replacing said end cap, and connecting said display unit to said supporting base by attaching said second sliding member support.

13. The invention set forth in claim 12 wherein said last-mentioned step includes the use of a reversible connector between said support and said display unit, said connector being adapted to change the angle between said supporting base and said display unit.

* * * * *